(12) United States Patent
Hessbrueggen et al.

(10) Patent No.: US 8,448,550 B2
(45) Date of Patent: May 28, 2013

(54) LATHE WITH TWO WORKPIECE SPINDLES

(75) Inventors: Markus Hessbrueggen, Goeppingen (DE); Juergen Mueller, Albershausen (DE); Juergen Moebus, Donzdorf (DE)

(73) Assignee: EMAG Holding GmbH, Salach (DE)

( * ) Notice: Subject to any disclaimer, the term of this patent is extended or adjusted under 35 U.S.C. 154(b) by 386 days.

(21) Appl. No.: 12/945,542

(22) Filed: Nov. 12, 2010

(65) Prior Publication Data
US 2012/0048075 A1  Mar. 1, 2012

(30) Foreign Application Priority Data

Nov. 12, 2009  (DE) .......................... 10 2009 052 984

(51) Int. Cl.
*B23B 29/24*  (2006.01)
(52) U.S. Cl.
CPC ...................................... *B23B 29/24* (2013.01)
USPC .................................. 82/122; 82/129; 82/125
(58) Field of Classification Search
CPC ................................. B23B 13/04; B23B 13/10
USPC ................... 82/122, 129, 125, 124, 126, 127, 82/142
See application file for complete search history.

(56) References Cited

U.S. PATENT DOCUMENTS

| 2,611,290 | A | * | 9/1952 | Bullard | 82/1.11 |
|---|---|---|---|---|---|
| 2,971,412 | A | * | 2/1961 | Fisher | 82/122 |
| 4,159,660 | A | * | 7/1979 | Buckley et al. | 82/118 |
| 4,197,769 | A | * | 4/1980 | Smith et al. | 82/129 |
| 4,442,739 | A | * | 4/1984 | Swanson et al. | 82/124 |
| 5,299,476 | A | * | 4/1994 | Tommasini et al. | 82/122 |
| 5,699,598 | A | * | 12/1997 | Hessbruggen et al. | 29/27 C |
| 6,021,695 | A | * | 2/2000 | Kosho et al. | 82/122 |

FOREIGN PATENT DOCUMENTS

JP  2002-126905  *  5/2002

* cited by examiner

*Primary Examiner* — Daniel Howell
*Assistant Examiner* — Ryan Rufo
(74) *Attorney, Agent, or Firm* — Andrew Wilford

(57) ABSTRACT

A machining apparatus has a frame and two generally parallel horizontal guides on the frame, one of which extends through at least one loading station and through at least one work station. A slide carrying a pair of spindles each capable of gripping a workpiece is shiftable between positions with the spindles aligned with the stations. A tool holder is shiftable on the other of the guides toward and away from the work station. Respective guides between each of the spindles and the slide allow vertical movement of the spindles on the slide. Actuators shift the slide horizontally on the one guide, shift the tool holder horizontally parallel to the slide on the other guide, and shift the spindles vertically on the slide.

6 Claims, 1 Drawing Sheet

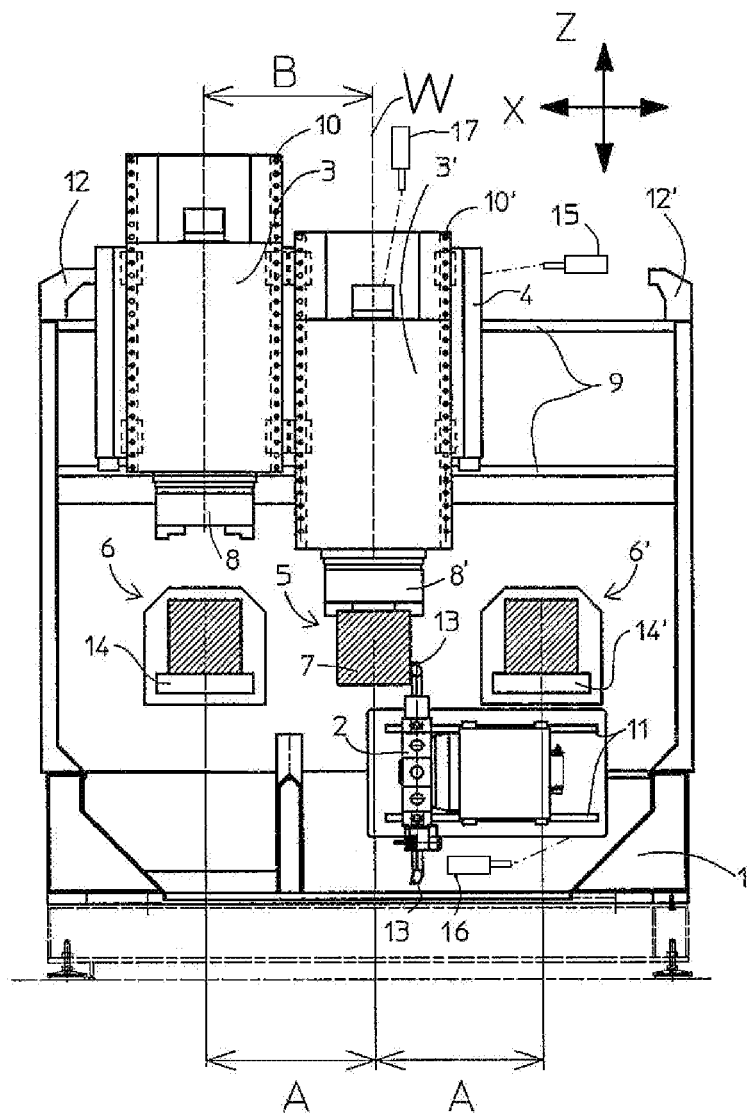

LATHE WITH TWO WORKPIECE SPINDLES

FIELD OF THE INVENTION

The present invention relates to a turning machine. More particularly this invention concerns a lathe with two workpiece spindles.

BACKGROUND OF THE INVENTION

As described in EP 1,171,309 a two-spindle lathe is moved along four axes so as to reduce the cycling time for machining workpieces. The control along the four axes is done by a complex digital control system, so the machine is expensive to manufacture, program, and maintain.

OBJECTS OF THE INVENTION

It is therefore an object of the present invention to provide an improved lathe with two workpiece spindles.

Another object is the provision of such an improved lathe with two workpiece spindles that overcomes the above-given disadvantages, in particular that is simpler than the prior-art such machine.

SUMMARY OF THE INVENTION

A machining apparatus has according to the invention a frame and two generally parallel horizontal guides on the frame, one of which extends through at least one loading station and through at least one work station offset horizontally from the loading station. A slide carrying a pair of spindles each capable of gripping a workpiece is shiftable between positions with the spindles aligned with the stations. A tool holder is shiftable on the other of the guides toward and away from the work station so that when one of the spindles is holding a workpiece in the work station and is rotating the workpiece the tool can machine the workpiece in the work station. Respective guides between each of the spindles and the slide allow vertical movement of the spindles on the slide. Actuators shift the slide horizontally on the one guide, shift the tool holder horizontally parallel to the slide on the other guide, and shift the spindles vertically on the slide.

A second such loading station symmetrically flanks the work station with the first-mentioned loading station. The loading stations are at the same spacing from a vertical center axis of the work station.

The spindles are driven to rotate a workpiece the hold about the axis when in the work station. Abutments on the frame define end positions for the slide in each of which one of the spindles is centered in a respective one of the loading stations.

Fresh workpieces are supplied to and finished workpieces are removed from each of the loading stations.

The tool holder holds a plurality of tools in a carousel rotatable about a horizontal axis parallel to the direction of displacement of the slide and tool holder.

BRIEF DESCRIPTION OF THE DRAWING

The above and other objects, features, and advantages will become more readily apparent from the following description, reference being made to the accompanying drawing whose sole FIGURE is a schematic side view of the machine according to the invention.

SPECIFIC DESCRIPTION

As seen in the drawing, the machining apparatus according to the invention has a stationary frame 1. Driven workpiece spindle assemblies 3 and 3' are mounted on a slide 4 movable along guides 9 fixed on the frame 1 in a horizontal direction X here parallel to the view plane. The spindles 3 and 3' carry on their lower ends respective chuck 8 and 8' for gripping and holding workpieces 7. The spindle 3 is in a work station 5. Directly next to it is a tool-holding carousel 2 riding on guides 11 on the frame 1 for movement also in the direction X. Since both the slide 4 and carousel 2 move in the same direction x, they take up only a small amount of space and are both quite accessible. One illustrated tool 13 is a chisel. In addition to fixed tools, driven tools can be used for milling, drilling, or grinding.

The spindles 3 and 3' can also move relative to the slide 4 on respective vertical guides 10 and 10' in a vertical direction Z also in the plane of the view. Two loading positions 6 and 6' symmetrically and diametrally flank a vertical axis W of the work station 5 by a spacing A. A fixed horizontal spacing B between the two spindles 3 and 3' is the same as the spacing A so the spindles 3 and 3' are either in the work station 5 or one of the loading stations 6 and 6'

Thus according to the invention while one of the tools 13 is machining a workpiece 7 being rotated by one of the spindles 3 or 3' in the station 5 about the axis W, another workpiece 7 can be unloaded from or loaded into the other of the spindles 3 and 3' in the other station 6. The workpieces are transported into and out of the stations 6 and 6' of the machine in a direction perpendicular to the plane of the view by standard conveyors 14 and 14' according to the pickup principle. The result is a very short cycling time between machining operations.

End positions of the slide 4 with the spindles 3 and 3' in the stations 6 and 6' are defined by respective stops or abutments 12 and 12' fixed on the frame 1 and engageable with the slide 4. Thus a simple actuator such as a hydraulic cylinder 15 can simply shift the slide 4 back and forth between the end positions defined by the stops 12 and 12' so that fine digital control of the actuator 15 is not needed.

As the workpiece 7 is being machined in the work station 5, the tool can be shifted in the direction x by another actuator 16 like the actuator 15. Another such actuator 17 (only one shown) can shift each of the spindle drives 3 and 3' along the respective guides 10 and 10' vertically on the slide 4 so that the tool 13 can do its work.

We claim:

1. A machining apparatus comprising:
   a frame;
   two generally parallel horizontal guides on the frame one of which extends through at least one loading station and through at least one work station offset horizontally from the loading station;
   a slide carrying a pair of spindles each capable of gripping a workpiece, the slide shiftable between positions with the spindles aligned with the stations;
   a tool holder shiftable on the other of the guides toward and away from the work station, whereby when one of the spindles is holding a workpiece in the work station and is rotating the workpiece, the tool can machine the workpiece in the work station; and
   respective guides between each of the spindles and the slide for vertical movement of the spindles on the slide;
   actuator means for shifting the slide horizontally on the one guide, for shifting the tool holder horizontally parallel to the slide on the other guide, and for shifting the spindles vertically on the slide.

2. The machining apparatus defined in claim 1 wherein a second such loading station symmetrically flanks the work station with the first-mentioned loading station, the loading stations being at the same spacing from a vertical center axis of the work station.

3. The machining apparatus defined in claim 2 wherein the spindles are driven to rotate a workpiece the hold about the axis when in the work station.

4. The machining apparatus defined in claim 2, further comprising
- abutments on the frame defining end positions for the slide in each of which one of the spindles is centered in a respective one of the loading stations.

5. The machining apparatus defined in claim 2, further comprising means for supplying fresh workpieces to and removing finished workpieces from each of the loading stations.

6. The machining apparatus defined in claim 2 wherein the tool holder holds a plurality of tools in a carousel rotatable about a horizontal axis parallel to the direction of displacement of the slide and tool holder.

* * * * *